US010621968B2

(12) United States Patent
Begum et al.

(10) Patent No.: US 10,621,968 B2
(45) Date of Patent: Apr. 14, 2020

(54) METHOD AND APPARATUS TO SYNTHESIZE VOICE BASED ON FACIAL STRUCTURES

(71) Applicant: INTEL CORPORATION, Santa Clara, CA (US)

(72) Inventors: Shamim Begum, Beaverton, OR (US); Alexander A. Oganezov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/039,053

(22) Filed: Jul. 18, 2018

(65) Prior Publication Data

US 2018/0322862 A1    Nov. 8, 2018

Related U.S. Application Data

(60) Continuation of application No. 15/440,371, filed on Feb. 23, 2017, now Pat. No. 10,056,073, which is a division of application No. 14/496,832, filed on Sep. 25, 2014, now Pat. No. 9,607,609.

(51) Int. Cl.
| | |
|---|---|
| G10L 13/027 | (2013.01) |
| G10L 13/033 | (2013.01) |
| G06K 9/00 | (2006.01) |
| G10L 13/047 | (2013.01) |

(52) U.S. Cl.
CPC ........ G10L 13/027 (2013.01); G06K 9/00315 (2013.01); G10L 13/033 (2013.01); G10L 13/047 (2013.01)

(58) Field of Classification Search
CPC .................................................... G10L 13/027
USPC .......................................................... 704/260
See application file for complete search history.

(56) References Cited

U.S. PATENT DOCUMENTS

| | | |
|---|---|---|
| 5,826,234 A | 10/1998 | Lyberg |
| 6,385,580 B1 | 5/2002 | Lyberg et al. |
| 6,449,595 B1 | 9/2002 | Arslan et al. |
| 6,735,566 B1 | 5/2004 | Brand |
| 7,168,953 B1 | 1/2007 | Poggio et al. |

(Continued)

FOREIGN PATENT DOCUMENTS

WO       2003100767 A1    12/2003

OTHER PUBLICATIONS

U.S. Appl. No. 14/496,832, Non-Final Office Action, dated Jul. 20, 2016, 12 pages.

(Continued)

*Primary Examiner* — Susan I McFadden

(57) ABSTRACT

A method for establishing an articulatory speech synthesis model of a person's voice includes acquiring image data representing a visage of a person, in which the visage includes facial characteristics defining exteriorly visible articulatory speech synthesis model parameters of the person's voice; selecting a predefined articulatory speech synthesis model from among stores of predefined models, the selection based at least in part on one or both of the facial characteristics or the exteriorly visible articulatory speech synthesis model parameters; and associating at least a portion of the selected predefined articulatory speech synthesis model with the articulatory speech synthesis model of the person's voice.

17 Claims, 7 Drawing Sheets

(56) References Cited

U.S. PATENT DOCUMENTS

| | | | |
|---|---|---|---|
| 8,884,982 | B2 | 11/2014 | Runge et al. |
| 9,607,609 | B2 | 3/2017 | Begum et al. |
| 10,056,073 | B2 * | 8/2018 | Begum .............. G06K 9/00315 |
| 10,242,666 | B2 * | 3/2019 | Monceaux .......... G10L 15/1815 |
| 2014/0278418 | A1 | 9/2014 | Chen et al. |
| 2017/0278517 | A1 | 9/2017 | Begum et al. |

OTHER PUBLICATIONS

U.S. Appl. No. 14/496,832, Notice of Allowance, dated Nov. 23, 2016, 9 pages.

U.S. Appl. No. 15/440,371, Notice of Allowance, dated May 1, 2018, 5 pages.

U.S. Appl. No. 15/440,371, Non-Final Office Action, dated Nov. 9, 2017, 6 pages.

Katsamanis, et al., "Face Active Appearance Modeling and Speech Acoustic Information to Recover Articulation", IEEE Transactions on Audio, Speech, and Language Processing, vol. 17, No. 3, Mar. 2009, pp. 411-422.

Kråger, et al., "A Gesture-Based Concept for Speech Movement Control in Articulatory Speech Synthesis", Verbal and Nonverbal Communication Behaviours, LNAI, 4775, 2007, pp. 174-189.

Levinson, et al., "Articulatory Speech Synthesis from the Fluid Dynamics of the Vocal Apparatus", Morgan & Claypool Publishers, 2012, 115 pages.

Nefian, et al., "An Embedded HMM-Based Approach for Face Detection and Recognition", Georgia Institute of Technology, School of Electrical and Computer Engineering, Center for Signal and Image Processing, Atlanta, Georgia 30332, Acoustics, Speech, and Signal Processing, IEEE International Conference on, vol. 06, 1999, pp. 3553-3556.

Palo, "A Review of Articulatory Speech Snythesis", Helsinki University of Technology, Department of Electrical and Communications Engineering, Laboratory of Acoustics and Audio Signal Processing, Jun. 5, 2006, 142 pages.

PCT/US2015/047465, International Search Report and Written Opinion, dated Dec. 9, 2015, 9 pages.

Shunji, "Estimated From the Voice of an Unknown Person's Face—Gender of Influence (English Translation)", The 75th Annual Convention of the Japanese Psychological Association, 2011, 3 pages.

Sotelo, et al., "Who Said That? The Crossmodal Matching Identity for Inferring Unfamiliar Faces From Voices", IEEE Computer Society, Eighth International Conference on Signal Image Technology and Internet Based Systems, 2012, pp. 97-107.

Szekely, et al., "WinkTalk: a Multimodal speech synthesis interface linking facial expressions to expressive synthetic voices", NAACL-HLT Workshop on Speech and Language Processing for Assistive Technologies (SLPAT), Montreal, Canada, Jun. 7-8, 2012, pp. 5-8.

* cited by examiner

| Person name | Facial image | Visible Articulatory Parameter ("VAP") Values | Invisible Articulatory Parameter ("IAP") Values |
|---|---|---|---|
| Amanda | Image$_1$ | VAP$_1$ <jaw$_1$, lipP$_1$, lipH$_1$, ...> | IAP$_1$ <tongueH$_1$, tongueW$_1$, velum$_1$, ...> |
| Bob | Image$_2$ | VAP$_2$ <jaw$_2$, lipP$_2$, lipH$_2$, ...> | IAP$_2$ <tongueH$_2$, tongueW$_2$, velum$_2$, ...> |
| Sophia | Image$_y$ | VAP$_y$ <jaw$_y$, lipP$_y$, lipH$_y$, ...> | IAP$_y$ <tongueH$_y$, tongueW$_y$, velum$_y$, ...> |
| Catherine | Image$_p$ | VAP$_p$ <jaw$_p$, lipP$_p$, lipH$_p$, ...> | IAP$_p$ <tongueH$_p$, tongueW$_p$, velum$_p$, ...> |

FIG. 3

| Person name | Visible Articulatory Parameter ("VAP") Values | Invisible Articulatory Parameter ("IAP") Values |
|---|---|---|
| Amanda | $VAP_1$ <$jaw_1$, $lipP_1$, $lipH_1$, ...> | $IAP_1$ <$tongueH_1$, $tongueW_1$, $velum_1$, ...> |
| Bob | $VAP_2$ <$jaw_2$, $lipP_2$, $lipH_2$, ...> | $IAP_2$ <$tongueH_2$, $tongueW_2$, $velum_2$, ...> |
| Sophia | $VAP_y$ <$jaw_y$, $lipP_y$, $lipH_y$, ...> | $IAP_y$ <$tongueH_y$, $tongueW_y$, $velum_y$, ...> |
| Catherine | $VAP_p$ <$jaw_p$, $lipP_p$, $lipH_p$, ...> | $IAP_p$ <$tongueH_p$, $tongueW_p$, $velum_p$, ...> |

FIG. 5

METHOD AND APPARATUS TO SYNTHESIZE VOICE BASED ON FACIAL STRUCTURES

RELATED APPLICATIONS

This application is a continuation of U.S. patent application Ser. No. 15/440,371, filed Feb. 23, 2017, which is a divisional of U.S. patent application Ser. No. 14/496,832, filed Sep. 25, 2014, now U.S. Pat. No. 9,607,609, each of which is hereby incorporated by reference.

TECHNICAL FIELD

Embodiments described herein relate generally to text-to-speech (TTS) systems, and relate more particularly to articulatory-based TTS systems for tailoring speech synthesis based on exteriorly visible facial structures of selected individuals.

BACKGROUND INFORMATION

Generic speech synthesis has been widely used in many applications including ones that can read email messages or other texts. Given a text input, a TTS system artificially produces human speech. The performance of a TTS system is characterized by naturalness, intelligibility, and complexity of its implementation. Natural language interfaces are becoming commonplace in computing devices generally, and particularly in mobile computing devices, such as smartphones, tablets, and laptop computers.

BRIEF DESCRIPTION OF THE DRAWINGS

FIG. 3 is a table view of a database storing preprocessed facial images with corresponding articulatory parameter values, according to an embodiment.

FIG. 5 is a table view of a database storing articulatory parameter values, according to an embodiment.

DETAILED DESCRIPTION OF EMBODIMENTS

Aspects and advantages will be apparent from the following detailed description of preferred embodiments, which proceeds with reference to the aforementioned drawings.

1. INTRODUCTION

Attempts in both academia and industry to improve TTS characteristics have included, for example, speech synthesis systems using articulatory speech synthesis models, which are computational techniques for synthesizing speech based on models of the human vocal tract and the articulation processes occurring therein. Such previous systems, however, use articulatory parameter values that do not necessarily match those of a particular person for whom a user wishes to hear as an emulated voice produced using speech synthesis. Furthermore, these earlier attempts have not synthesized speech of a given individual based on exteriorly visible articulatory parameters derived from an image of the individual's face. Thus, sound produced from these articulatory speech synthesis models does not sound like speech produced from the particular person's own voice.

A recent psychological study described by Shunji Awazu in "Inference from Unfamiliar Voices to Unfamiliar Faces—Influence of Gender Difference," for the 75th Annual Convention of the Japanese Psychological Association, p. 607, 2011, posited that people with similar voices have similar facial features. Escoto et al. also describe this observation in "Who Said That? The Crossmodal Matching Identity for Inferring Unfamiliar Faces from Voices," for the 2012 Eighth International Conference on Signal Image Technology and Internet Based Systems.

This disclosure explains that similar facial features produce similarly sounding voices because the facial features (which may be defined according to visible articulatory parameters) impart similar shaping of sound frequencies as they travel through human speech production system. The embodiments set forth in this disclosure use correlation between facial features (e.g., between visible articulatory parameters) and the sound frequencies generated by an individual in order to synthesize a voice of that individual based on his or her facial structure.

Figure 1:
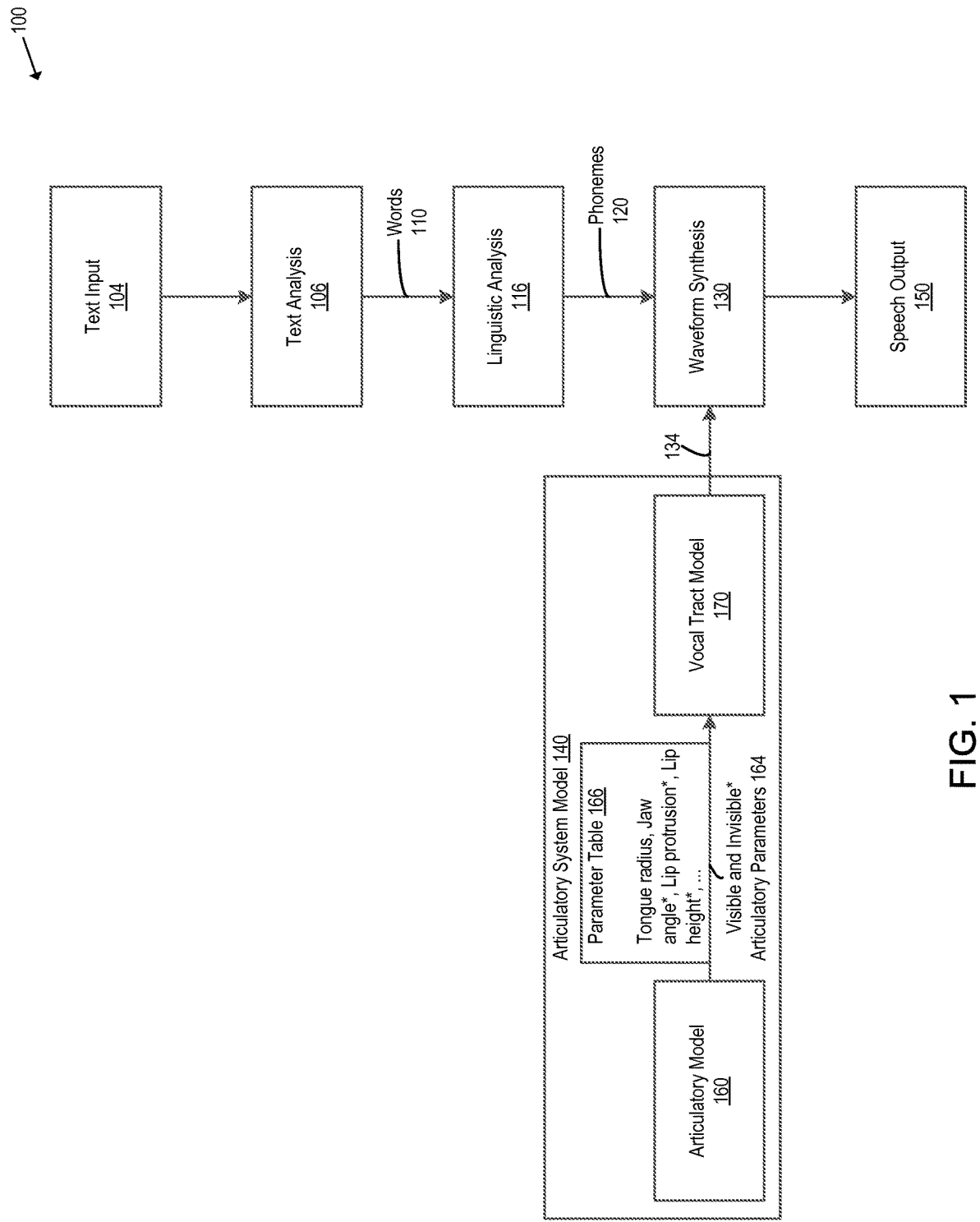
FIG. 1 is a block diagram of a TTS system including articulatory-based speech synthesis, according to an embodiment.
Figure 2:
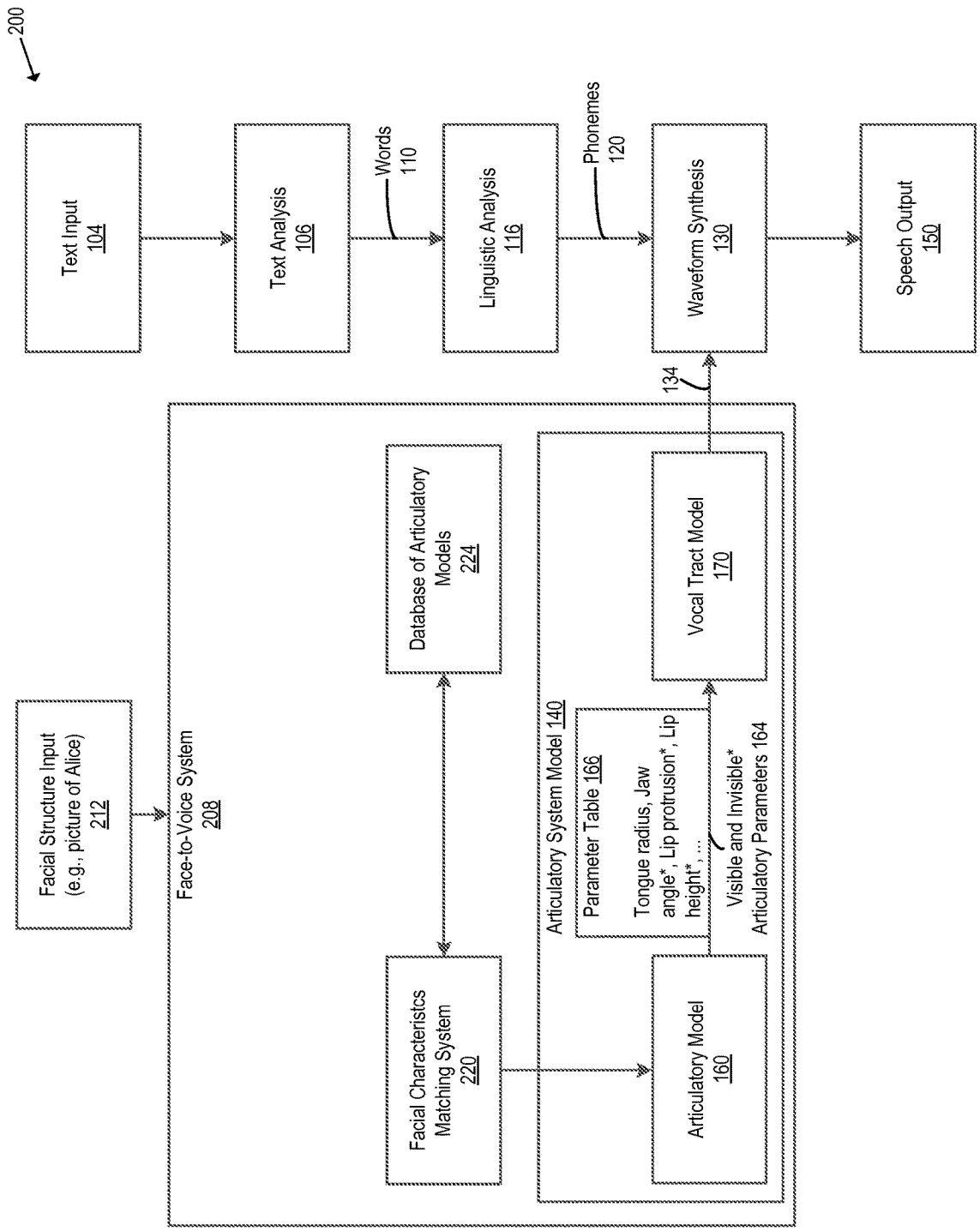
FIG. 2 is a block diagram of a TTS system including articulatory-based speech synthesis tailored using a face-to-voice system, according to an embodiment.
Figure 4:
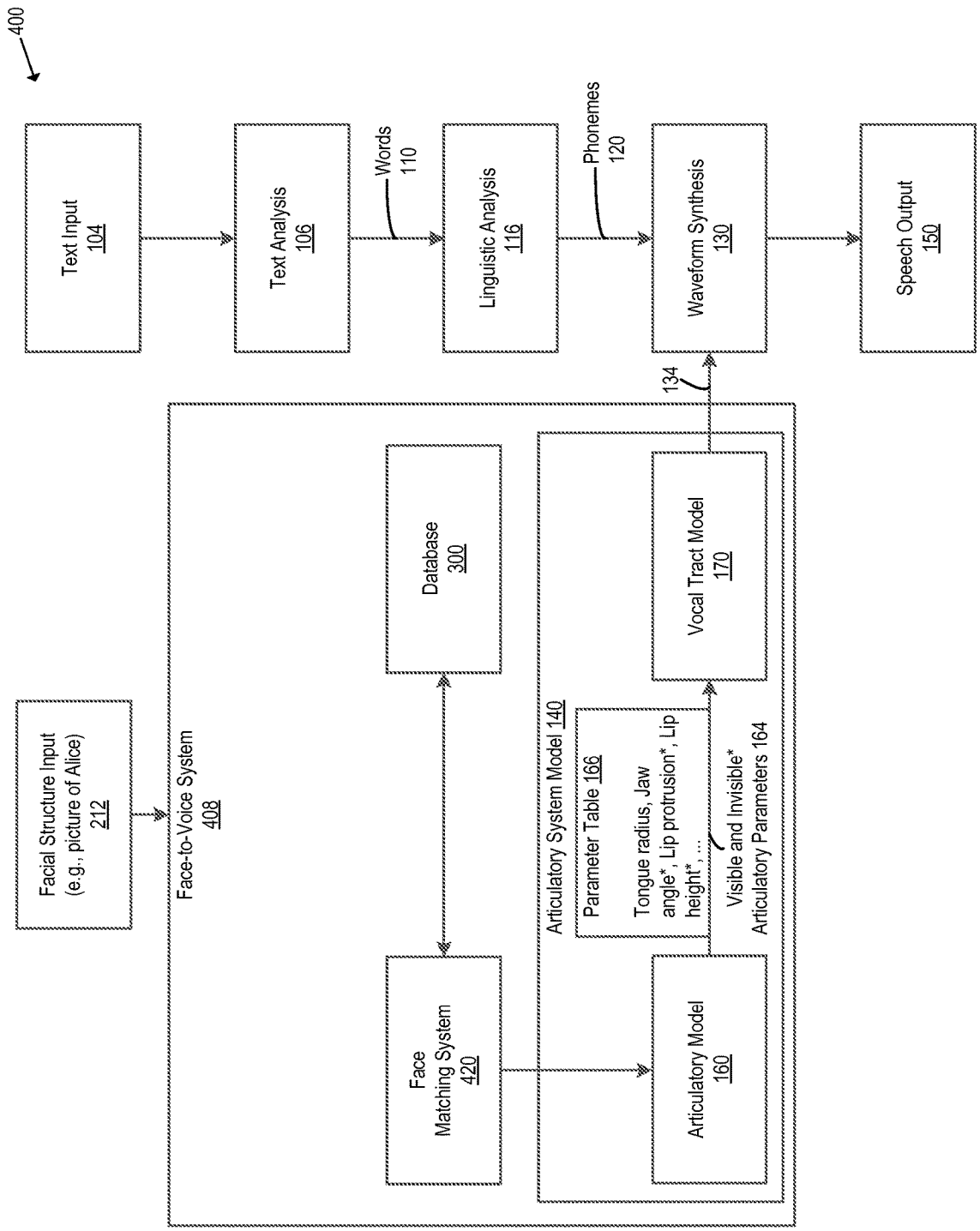
FIG. 4 is a block diagram of the TTS system of FIG. 2 employing an image-based matching approach to obtaining from the database of FIG. 3 articulatory parameters used to emulate a given individual's voice for speech synthesis, according to an embodiment.
Figure 6:
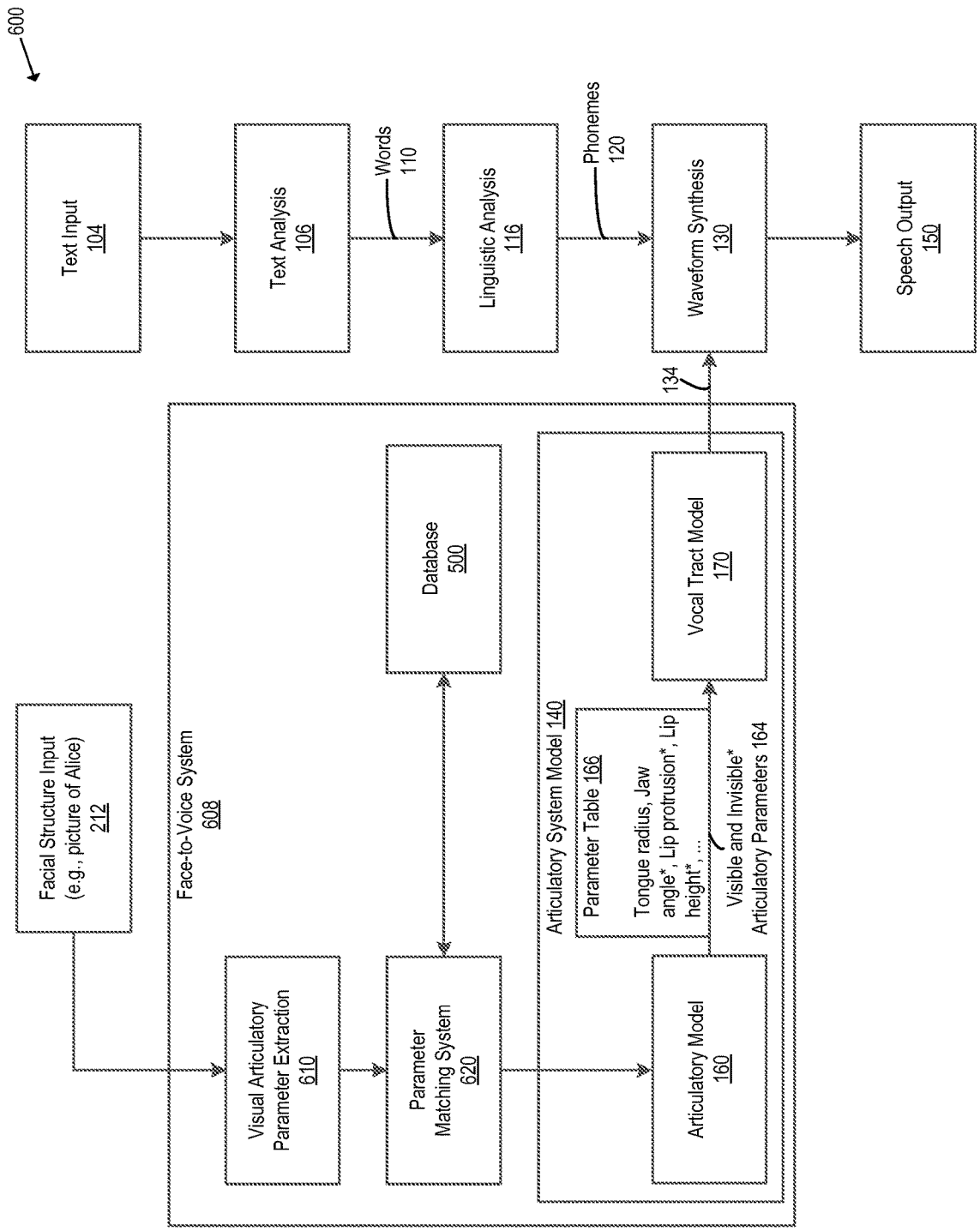
FIG. 6 is a block diagram of the TTS system of FIG. 2 employing an articulatory-based matching approach to obtaining from the database of FIG. 5 articulatory parameters used to emulate a given individual's voice for speech synthesis, according to an embodiment.

Embodiments of articulatory speech synthesis systems described herein exploit this correlation between articulatory parameters and voices in order to synthesize speech of any given individual. For example, the articulatory speech synthesis system embodiments generate, based on an image showing a person's face, an approximation of a voice of the person depicted in the image. FIGS. 1 and 2 provide an overview of the TTS embodiments, and FIGS. 4 and 6 provide two specific approaches: an image-based matching approach, and an articulatory-based matching approach. These embodiments synthesize speech of a given individual dynamically in real time based on facial image of the individual and a set of baseline database records having corresponding articulatory speech models for the records.

2. OVERVIEW OF TTS EMBODIMENTS

FIG. 1 shows an embodiment of a TTS system 100. The TTS system 100 is generally based on a framework described in "Articulatory Speech Synthesis from the Fluid Dynamics of the Vocal Apparatus," by S. Levinson, D. Davis, S. Simon, J. Huang, (Morgan & Claypool publishers, published July 2012). For example, AT&T has implemented a TTS system described in chapter 2, section 2.1 and depicted in FIG. 2.1 of the foregoing Levison et al. reference.

The system 100 receives a text input 104, which is analyzed by a text analysis module 106 to extract words 110 from the text input 104. The words 110 are obtained by converting raw text containing symbols like numbers and abbreviations into the equivalent of spelled-out words. This process is often called text normalization, preprocessing, or tokenization.

The words 110 are then further processed by a linguistic analysis module 116 to phonetic transcriptions to each of the words 110. The linguistic analysis module 116 divides and marks text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output, and referred to as phonemes 120.

The phonemes 120 are input into a waveform synthesis module 130, which also receives sound frequency information 134 (e.g., sound frequencies) from an articulatory system model 140. The information 134 generated by the articulatory system model 140 and the phonemes 120 is synthesized using the waveform synthesis module 130 (e.g., wave synthesizer) to produce a speech output 150. Waveform synthesis is described in chapter 6 and shown in FIGS. 6.1-6.6 of the Levison et al. reference.

The articulatory system model 140 includes an articulatory model 160 for modeling a voice. Examples of articulatory models are also described in the Levison et al. reference. For example, chapter 2, section 2.3.3 describes and FIG. 2.12 shows the seminal Mermelstein articulatory model, which provides a general framework for the articulatory system model 140.

Articulatory system model 140 permits control over and adjustment to articulatory parameters 164 (shown by examples listed in parameter table 166) that articulatory model 160 provides to a vocal tract model 170. For example, tongue radius, tongue height, jaw angle, lip protrusion, and lip height are articulatory parameters that can be controlled to tailor the sound frequencies generated by the vocal tract model 170 during speech production. Additional information on the vocal tract model 170 is available in Levison et al. reference at chapter 2.3.4 and FIG. 2.13.

Conventional TTS models do not differentiate between visible (e.g., lip and jaw) and invisible (e.g., tongue, velum) articulatory parameters, but the articulatory parameters 164 are identified as being visible or invisible. The articulatory parameters 164 are identified in this way so that the TTS system 100 may synthesize a voice of an individual based on his or her facial image. As noted previously, the TTS system 100 exploits a correlation between facial features (i.e., the visible articulatory parameters) and sound frequencies generated by the individual.

FIG. 2 shows a TTS system 200 that includes many of the components of the TTS system 100. System 200 though also includes a face-to-voice system 208 that receives facial structure input 212, such as image data representing a face portrait showing a visage of a person (for example, Alice). The facial structure input 212 is used by a face-based (FIGS. 3 and 4) or parameter-based (FIGS. 5 and 6) matching system 220 (generally, a facial characteristics matching system 220) for comparison to a baseline database of predefined articulatory models 224. The facial characteristics matching system 220 obtains from the database 224 at least a portion of a predefined model 160 that includes parameters 164 that are correlated with the facial structure input 212. The TTS system 200 uses these parameters 164 to synthesize speech of Alice dynamically in real time, as described previously.

3. IMAGE-BASED MATCHING APPROACH

FIG. 3 shows a baseline database 300, represented by an example table 310 of records associated with predefined articulatory models and facial images for Amanda 312, Bob 320, Sophia 324, and Catherine 330. Each person's record includes a stored facial image and a predefined articulatory model divided according to parameters that are visible exteriorly, and invisible (i.e., concealed from external observation within a person's mouth or vocal tract). For example, Sophia's record 324 includes her picture (Image$_y$); visible articulatory parameter values (VAP$_y$,<jaw$_y$, lipP$_y$, lipH$_y$, >); and invisible articulatory parameter values (IAP$_y$,<tongueH$_y$, tongueW$_y$, velum$_y$, . . . >). The VAP values quantify facial structures that may be observed from a picture (Image$_r$) of Sophia's face: her jaw and lip facial characteristics <jaw$_y$, lipP$_y$, lipH$_y$, . . . >, in which "jaw" means jaw angle, "lipP" means lip protrusion, and "lipH" means lip height. The IAP values quantify vocal tract structures that are not observable from the picture: Sophia's tongue and velum characteristics <tongueH$_y$, tongueW$_y$, velum$_y$, . . . >, in which "tongueH" means tongue height, "tongueW" means tongue width, and "velum" means velum length. In some embodiments, other VAP and IAP characteristics are possible, and the facial images and parameters can be distributed across several databases. The baseline database 300 can be stored in a user equipment device (FIG. 7) or on a remote server.

FIG. 4 is an example image-based matching TTS system 400 that uses a face-to-voice system 408 including a face-matching system 420 to obtain the parameters 164 from the database 300 (see e.g., FIG. 3) containing known tuples of face images and articulatory parameters. The face-to-voice system 408 acquires image data representing a visage of a person (Alice), in which the visage includes facial characteristics defining exteriorly visible articulatory speech synthesis model parameters of the person's voice. For example, the face-to-voice system 408 can receive an image file through a network connection, or it can use a locally stored image that was captured using an image capture device. The face-matching system 420 implementation uses the image data and existing pseudo 2D hidden Markovian models (PHMM) for achieving suitable face matching between the person in the image and a person identified by an image in the database 300. Examples of PHMM-based models are described by A. V. Nefian and M. H. Hayes III, in "An Embedded HMM-Based Approach for Face Detection and Recognition," for the Proceeding of the 1999 Institute of Electrical and Electronics Engineers International Conference on Acoustics, Speech and Signal Processing (vol. 6, pp. 3553-56, May 1999). Accordingly, PHMM may be used to find the best matching subject based on an image match.

Based on the observation that similar faces produce similar voices, articulatory parameters of a closest matching face from the baseline database 300 will be used for the synthesized voice for Alice. For example, Alice may closely resemble Sophia, so the VAP and IAP values, or just the IAP values of the yth entry (Sophia) 324 of FIG. 3, may be used as the articulatory model 160 for Alice.

Using the VAP and IAP values of Sophia would produce synthesized speech that is modeled on Sophia's voice. In this case, some of the natural individuality of Alice's generated speech may be somewhat lost. Therefore, in some embodiments, the baseline frequency of Sophia's voice can be further adjusted based on the visual differences between the best match (Sophia) and the target person (Alice, in this example). For example, one such adjustment would use IAP values of Sophia, and then VAP values of Alice that are extracted from the facial structure input image 212. This technique is described in later paragraphs with reference to FIGS. 5 and 6.

4. ARTICULATORY-BASED MATCHING APPROACH

FIG. 5 shows a baseline database 500, represented by an example table 510 of records associated with predefined articulatory models for Amanda 512, Bob 520, Sophia 524, and Catherine 530. Note that no stored database images of the baseline subjects are included in the database 500.

The database 500 does not have pictures of modeled persons because a parameter-matching approach of FIG. 6 relies on the fact that there exists a correlation between similar externally visible facial features and similar voices. Therefore, visible articulatory parameters obtained from the visible facial features serve as a direct reference for obtaining at least a portion of a predefined articulatory model. Accordingly, FIG. 6 presents the approach in which the inputs to the system are a facial image of a person (say, Alice), a text input, and a baseline database of <visible articulatory parameters, invisible articulatory parameters> tuples. The baseline database 500 can be stored in a user equipment device (FIG. 7) or on a remote server.

FIG. 6 is an example image-based matching TTS system 600 that uses a face-to-voice system 608 including visible articulatory parameter extraction 610 and a parameter-matching system 620 to obtain the parameters 164 from the database 500 (see e.g., FIG. 5) containing known tuples of visible and invisible articulatory parameters.

The face-to-voice system 608 acquires image data representing a visage of a person (Alice), in which the visage includes facial characteristics defining exteriorly visible articulatory speech synthesis model parameters of the person's voice. As noted previously, this acquisition may be performed locally on a user device, or it may include a transmission of data to or from a remote server.

The articulatory parameter extraction 610 analyzes the facial structure input image 212 to extract the visible parameters, which are used as a key to find the best-matched sound frequencies that are used in the speech synthesis stage. An example of face detection and feature extraction is described by Liu Zhi-fang et al., in "Face detection and facial feature extraction in color image," for the Proceeding of the 2003 Fifth International Conference on Computational Intelligence and Multimedia Applications (pp. 27-30, September 2003). Shih et al. describe image processing and pattern recognition techniques to extract human faces and facial features from color images in "Extracting Faces And Facial Features From Color Images" for the International Journal of Pattern Recognition and Artificial Intelligence (vol. 22, issue 3, May 2008).

The parameter-matching system 620 then receives the extracted parameters for comparison to those stored in the database 500. The parameter-matching system 620 can use any number of techniques to score the closest match of visible articulatory parameters from the database 500. For example, the parameter-matching system 620 may use a Euclidian distance, sum of squares calculator, or another technique to find the closest match.

In some embodiments, the face-to-voice system 608 also uses the deltas between the visible articulatory parameters to offset the differences between speech signals of yth entry of the database 500 (e.g., Sophia) and the target (Alice) and therefore is able to generate the speech of Alice. For example, the articulatory model 160 may include VAP values extracted from Alice's picture, and IAP values of Sophia that are stored in the database 500. This approach would include techniques to account for noise in the extracted VAP values that is attributable to, for example, muscle and fat that may introduce errors during extraction of articulatory parameters from image of the face. In another embodiment, both of Sophia's VAP and IAP values may be used for synthesizing an approximation of Alice's voice.

5. EXAMPLE USER EQUIPMENT DEVICE FOR SPEECH SYNTHESIS

Figure 7:
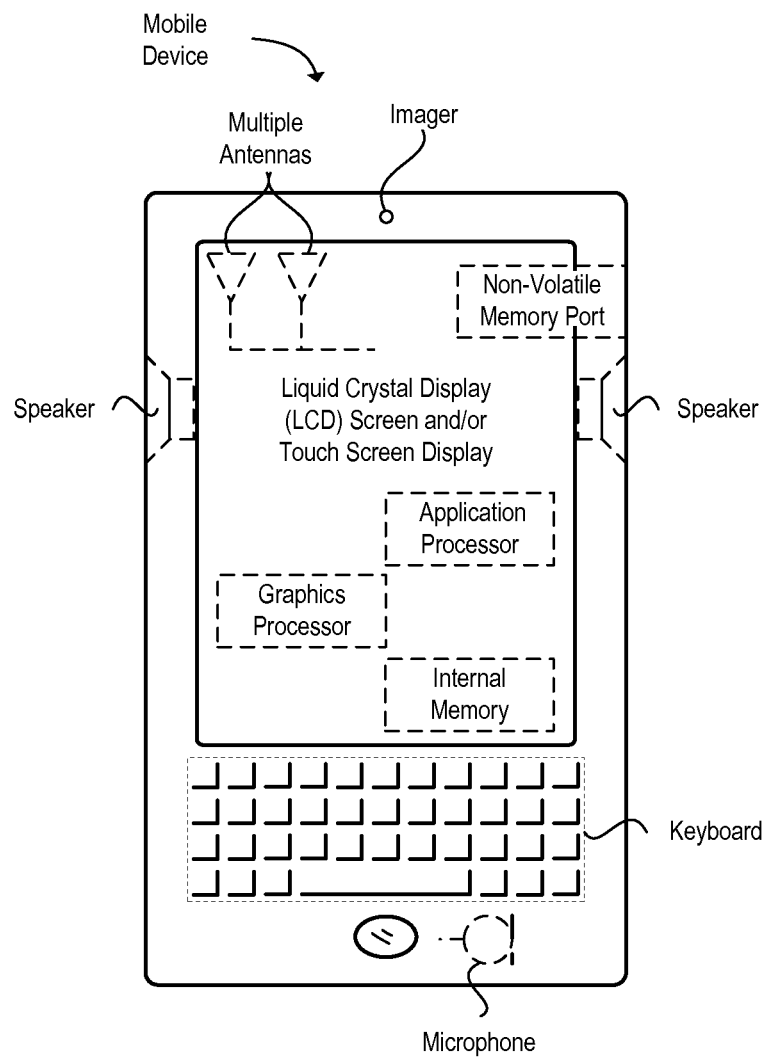
FIG. 7 is a block diagram of an example of a mobile user equipment device.

FIG. 7 provides an example illustration of a mobile user equipment device, such as a mobile station, a mobile wireless device, a mobile communication device, a tablet, a handset, or other type of mobile wireless device. The mobile device can include one or more antennas configured to communicate with a transmission station, such as a base station, an evolved Node B, a base band unit, a remote radio head, a remote radio equipment, a relay station, a radio equipment, or other type of wireless wide area network (WWAN) access point. The mobile device can be configured to communicate using at least one wireless communication standard including 3GPP LTE, WiMAX, high-speed packet access, Bluetooth, and WiFi. The mobile device can communicate using separate antennas for each wireless communication standard or shared antennas for multiple wireless communication standards. The mobile device can communicate in a wireless local area network, a wireless personal area network, and/or a WWAN.

FIG. 7 also provides an illustration of a microphone and one or more speakers that can be used for audio input to and output from the mobile device. The display screen may be a liquid crystal display screen, or other type of display screen such as an organic light emitting diode display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen. The mobile device may be equipped with an digital camera or other imager for obtaining digital images.

Speech synthesis tailored to an individual's voice provides for potential new applications. For example "mom-e-reader" would read aloud an ebook by synthesizing a mother's voice dynamically in real time. There are numerous use cases and applications that can use aspects of this disclosure, including speech synthesis for applications like GPS and alarms, and therapeutic applications like speech therapy. The following are some potential applications for future products or interests: Mom-e-reader, which includes an ereader application reading stories in a mother's (or any particular person of choice) voice using preloaded image of the mother; customization of applications on mobile devices, for example, message reader, GPS with a person of choice; synthesizing voice of patients with various speech disabilities (for example, a person who is unable to speak); or synthesize voice of deceased people based on their photo images, which may be used when there is no recording of their voice.

6. SERVER-BASED PROCESSING

In some embodiments, any portion of the face-to-voice systems 208, 408, and 608 may be hosted on user equipment, or a remote server. For example, parameter extraction 610 may occur on a user equipment device or on a server. Cloud storage of the database 300 or 500 may raise both privacy and security concerns, and storing it in a target system would use both space and local processing power in the system.

For cloud-based embodiments, in order to avoid erroneous data submissions, a data filtering system is used to check the data integrity. An example of such filtering system would receive a voice sample submission of a known text together with an image (or a set of voice synthesis parameters). Based on parameters of the submission (or those obtained from system 608), a synthesized text is converted to a speech sample. That sample is then compared with the submitted voice sample. Clear mismatches are rejected as invalid submissions.

7. EXAMPLE EMBODIMENTS

Examples may include subject matter such as a method, means for performing acts of the method, at least one machine-readable medium including instructions that, when performed by a machine cause the machine to perform acts of the method, or of an apparatus or system for articulatory-based text-to-speech conversion according to embodiments and examples described herein. The following examples are enumerated for purposes of clarity.

Example 1

An apparatus for use in an articulatory-based text-to-speech conversion system to establish an articulatory speech synthesis model of a person's voice, the apparatus comprising: a facial structure input device to acquire image data representing a visage of a person, in which the visage includes facial characteristics defining exteriorly visible articulatory speech synthesis model parameters of the person's voice; a facial characteristics matching system to select a predefined articulatory speech synthesis model from among stores of predefined models, the selection based at least in part on one or both of the facial characteristics or the exteriorly visible articulatory speech synthesis model parameters; and an articulatory system to associate at least a portion of the selected predefined articulatory speech synthesis model with the articulatory speech synthesis model of the person's voice.

Example 2

The apparatus of example 1, in which the selection is based on a measure of a face-matching correlation between the facial characteristics of the visage of the person and facial characteristics defining visible articulatory speech synthesis model parameters of the predefined models.

Example 3

The apparatus of example 2, in which the measure of face-matching correlation is derived using a hidden Markovian model.

Example 4

The apparatus of example 1, in which the facial structure input device is configured to acquire the image data by capturing an image with an imager in a user equipment device.

Example 5

The apparatus of any of examples 1 through 4, in which the facial characteristics matching system is configured to select by comparing the one or both of the facial characteristics or the exteriorly visible articulatory speech synthesis model parameters to those of the predefined models.

Example 6

The apparatus of any of examples 1 through 4, in which the facial characteristics matching system is configured to select by communicating the image data from a user equipment device to a server for initiating a comparison of the one or both of the facial characteristics or the exteriorly visible articulatory speech synthesis model parameters to those of the predefined models.

Example 7

The apparatus of any of examples 1 through 4, in which the articulatory system is configured to associate the at least the portion of the selected predefined articulatory speech synthesis model by synthesizing speech using model parameters of the selected predefined articulatory speech synthesis model.

Example 8

An apparatus for use in an articulatory-based text-to-speech conversion system configured to establish an articulatory speech synthesis model of a person's voice, the apparatus comprising: means for acquiring image data representing a visage of a person, in which the visage includes facial characteristics defining exteriorly visible articulatory speech synthesis model parameters of the person's voice; means for selecting a predefined articulatory speech synthesis model from among stores of predefined models, the selection based at least in part on one or both of the facial characteristics or the exteriorly visible articulatory speech synthesis model parameters; and means for associating at least a portion of the selected predefined articulatory speech synthesis model with the articulatory speech synthesis model of the person's voice.

Example 9

The apparatus of example 8, in which the selection is based on a measure of a face-matching correlation between the facial characteristics of the visage of the person and facial characteristics defining visible articulatory speech synthesis model parameters of the predefined models.

Example 10

The apparatus of example 9, in which the measure of face-matching correlation is derived using a hidden Markovian model.

Example 11

The apparatus of example 8, in which the means for selecting comprises means for comparing the one or both of the facial characteristics or the exteriorly visible articulatory speech synthesis model parameters to those of the predefined models.

Example 12

The apparatus of any of examples 8 through 11, in which the means for acquiring comprises means for capturing an image with an imager in a user equipment device.

Example 13

The apparatus of example 8, in which the means for selecting comprises means for communicating the image data from a user equipment device to a server and thereby initiating a comparison of the one or both of the facial characteristics or the exteriorly visible articulatory speech synthesis model parameters to those of the predefined models.

Example 14

The apparatus of example 8, in which the means for the associating of the at least the portion of the selected predefined articulatory speech synthesis model comprises means for synthesizing speech using model parameters of the selected predefined articulatory speech synthesis model.

Example 15

The apparatus of example 8, in which each one of the predefined models includes exteriorly visible articulatory speech synthesis model parameters defined by facial characteristics of a corresponding modeled voice, and in which each one of the predefined models includes interiorly concealed articulatory speech synthesis model parameters defined by internal vocal tract characteristics of the corresponding modeled voice.

Example 16

The apparatus of example 15, in which the means for the associating of the at least the portion of the selected predefined articulatory speech synthesis model comprises synthesizing speech based on the exteriorly visible articulatory speech synthesis model parameters of the person's voice and based on the interiorly concealed articulatory speech synthesis model parameters of the selected predefined articulatory speech synthesis model.

Example 17

The apparatus of example 15, in which the selection is based on a measure of correlation between the exteriorly visible articulatory speech synthesis model parameters of the person's voice and the exteriorly visible articulatory speech synthesis model parameters of the selected predefined articulatory speech synthesis model.

Example 18

The apparatus of example 15, in which the means for the associating of the at least the portion of the selected predefined articulatory speech synthesis model comprises means for communicating to a user equipment device the interiorly concealed articulatory speech synthesis model parameters of the selected predefined articulatory speech synthesis model for use in conjunction with exteriorly visible articulatory speech synthesis model parameters of the person's voice.

Example 19

The apparatus of any of examples 8 through 11, in which the means for acquiring of the image data comprises means for receiving an image file communicated over a network from a user equipment device.

Example 20

The apparatus of example 8, in which the means for the associating of the at least the portion of the selected predefined articulatory speech synthesis model comprises means for communicating to a user equipment device interiorly concealed articulatory speech synthesis model parameters of the selected predefined articulatory speech synthesis model.

Example 21

The apparatus of example 20, further comprising means for combining the exteriorly visible articulatory speech synthesis model parameters of the person's voice with the interiorly concealed articulatory speech synthesis model parameters.

Example 22

The apparatus of example 8, in which the stores of predefined models comprise a database, and the apparatus further comprises: means for receiving a submission of a predefined model, the submission including a voice sample recording of a known text input; and means for determining whether a synthesized speech output produced using the predefined model matches the voice sample recording.

Example 23

The apparatus of example 22, in which the stores of predefined models comprise a database, and the apparatus further comprises means for rejecting the submission in response to the synthesized speech output insufficiently matching the voice sample recording.

Example 24

A method for text-to-speech conversion, comprising: sending, to an articulatory model server, exterior facial structural information of a person; receiving, from the articulatory model server, at least a portion of a predefined articulatory model that corresponds to the exterior facial structural information; and converting text input to speech output based at least partly on the predefined articulatory model.

Example 25

The method of example 24, in which the exterior facial structural information includes one or both of a picture of the person's face or articulatory parameters extracted from the picture.

Example 26

The method of example 25, in which the portion of the predefined articulatory model includes invisible articulatory parameters corresponding to a modeled person who is different from the person shown in the picture.

Example 27

The method of example 25, in which the portion of the predefined articulatory model includes visible articulatory parameters corresponding to a modeled person who is different from the person shown in the picture.

Example 28

The method of example 25, in which the exterior facial structural information includes a picture of the person's face, and in which the sending causes the articulatory model server to extract the articulatory parameters from the picture.

Example 29

The method of example 25, in which the sending causes the articulatory model server to match the person's picture to a stored picture of a person represented by the predefined articulatory model.

Example 30

The method of example 25, in which the sending causes the articulatory model server to match the articulatory parameters extracted from the picture to those of the predefined articulatory model.

Example 31

A method for text-to-speech conversion, comprising: receiving, from a user equipment device, exterior facial structural information of a person; determining at least a portion of an articulatory model that corresponds to the exterior facial structural information based on a comparison of the exterior facial structural information to exterior facial structural information stored in a database of articulatory models; and sending, to the user equipment device, the at least the portion of the articulatory model that corresponds to the exterior facial structural information of the person.

Example 32

The method of example 31, in which the exterior facial structural information includes one or both of a picture of the person's face or articulatory parameters extracted from the picture.

Example 33

The method of example 32, in which the portion of the predefined articulatory model includes invisible articulatory parameters corresponding to a modeled person who is different from the person shown in the picture.

Example 34

The method of example 32, in which the portion of the predefined articulatory model includes visible articulatory parameters corresponding to a modeled person who is different from the person shown in the picture.

Example 35

The method of example 32, in which the exterior facial structural information includes a picture of the person's face, and in which the receiving causes an articulatory model server to extract the articulatory parameters from the picture.

Example 36

The method of example 32, in which the receiving causes an articulatory model server to match the person's picture to a stored picture of a person represented by the predefined articulatory model.

Example 37

The method of example 32, in which the receiving causes an articulatory model server to match the articulatory parameters extracted from the picture to those of the predefined articulatory model.

Example 38

A method for establishing an articulatory speech synthesis model of a person's voice, the method comprising: acquiring image data representing a visage of a person, in which the visage includes facial characteristics defining exteriorly visible articulatory speech synthesis model parameters of the person's voice; selecting a predefined articulatory speech synthesis model from among stores of predefined models, the selection based at least in part on one or both of the facial characteristics or the exteriorly visible articulatory speech synthesis model parameters; and associating at least a portion of the selected predefined articulatory speech synthesis model with the articulatory speech synthesis model of the person's voice.

Example 39

The method of example 38, in which the selection is based on a measure of a face-matching correlation between the facial characteristics of the visage of the person and facial characteristics defining visible articulatory speech synthesis model parameters of the predefined models.

Example 40

The method of example 39, in which the measure of face-matching correlation is derived using a hidden Markovian model.

Example 41

The method of example 38, in which the acquiring comprises capturing an image with an imager in a user equipment device.

Example 42

The method of example 38, in which the selecting comprises comparing the one or both of the facial characteristics or the exteriorly visible articulatory speech synthesis model parameters to those of the predefined models.

Example 43

The method of example 38, in which the selecting comprises communicating the image data from a user equipment device to a server for initiating a comparison of the one or both of the facial characteristics or the exteriorly visible articulatory speech synthesis model parameters to those of the predefined models.

Example 44

The method of example 38, in which the associating of the at least the portion of the selected predefined articulatory speech synthesis model comprises synthesizing speech using model parameters of the selected predefined articulatory speech synthesis model.

Example 45

The method of example 38, in which each one of the predefined models includes exteriorly visible articulatory speech synthesis model parameters defined by facial characteristics of a corresponding modeled voice and interiorly concealed articulatory speech synthesis model parameters defined by internal vocal tract characteristics of the corresponding modeled voice.

Example 46

The method of example 45, in which the associating of the at least the portion of the selected predefined articulatory speech synthesis model comprises synthesizing speech based on the exteriorly visible articulatory speech synthesis model parameters of the person's voice and based on the interiorly concealed articulatory speech synthesis model parameters of the selected predefined articulatory speech synthesis model.

Example 47

The method of example 45, in which the selection is based on a measure of correlation between the exteriorly visible articulatory speech synthesis model parameters of the person's voice and the exteriorly visible articulatory speech synthesis model parameters of the selected predefined articulatory speech synthesis model.

Example 48

The method of example 45, in which the associating of the at least the portion of the selected predefined articulatory speech synthesis model comprises communicating to a user equipment device the interiorly concealed articulatory speech synthesis model parameters of the selected predefined articulatory speech synthesis model for use in conjunction with exteriorly visible articulatory speech synthesis model parameters of the person's voice.

Example 49

The method of example 38, in which the acquiring of the image data comprises receiving an image file communicated over a network from a user equipment device.

Example 50

The method of example 49, in which the selecting comprises comparing of the one or both of the facial characteristics or the exteriorly visible articulatory speech synthesis model parameters to those of the predefined models.

Example 51

The method of example 38, in which the associating of the at least the portion of the selected predefined articulatory speech synthesis model comprises communicating to a user equipment device interiorly concealed articulatory speech synthesis model parameters of the selected predefined articulatory speech synthesis model.

Example 52

The method of example 51, further comprising combining the exteriorly visible articulatory speech synthesis model parameters of the person's voice with the interiorly concealed articulatory speech synthesis model parameters.

Example 53

The method of example 48, in which the stores of predefined models comprise a database, and the method further comprising: receiving a submission of a predefined model, the submission including a voice sample recording of a known text input; and determining whether a synthesized speech output produced using the predefined model matches the voice sample recording.

Example 54

The method of example 53, in which the stores of predefined models comprise a database, and the method further comprising rejecting the submission in response to the synthesized speech output insufficiently matching the voice sample recording.

Example 55

At least one computer readable storage medium, having instructions stored thereon, that when executed on a device perform the method of any of examples 24 to 54.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., which performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by skilled persons that many changes may be made to the details of the above-described embodiments without departing from the underlying principles of the invention. The scope of the present invention should, therefore, be determined only by the following claims.

The invention claimed is:

1. A method for establishing an articulatory speech synthesis model of a person's voice, the method comprising:
   acquiring image data representing a visage of a person, in which the visage includes facial characteristics defining exteriorly visible articulatory speech synthesis model parameters of the person's voice;
   selecting a predefined articulatory speech synthesis model from among stores of predefined models, wherein the stores of predefined models comprise a database, the selection based at least in part on one or both of the facial characteristics or the exteriorly visible articulatory speech synthesis model parameters;
   associating at least a portion of the selected predefined articulatory speech synthesis model with the articulatory speech synthesis model of the person's voice;
   receiving a submission of a predefined model, the submission including a voice sample recording of a known text input; and
   determining whether a synthesized speech output produced using the predefined model matches the voice sample recording.

2. The method of claim 1, in which the selection is based on a measure of a face-matching correlation between the facial characteristics of the visage of the person and facial characteristics defining visible articulatory speech synthesis model parameters of the predefined models.

3. The method of claim 2, in which the measure of face-matching correlation is derived using a hidden Markovian model.

4. The method of claim 1, in which the acquiring comprises capturing an image with an imager in a user equipment device.

5. The method of claim 1, in which the selecting comprises comparing the one or both of the facial characteristics or the exteriorly visible articulatory speech synthesis model parameters to those of the predefined models.

6. The method of claim 1, in which the selecting comprises communicating the image data from a user equipment device to a server for initiating a comparison of the one or both of the facial characteristics or the exteriorly visible articulatory speech synthesis model parameters to those of the predefined models.

7. The method of claim 1, in which the associating of the at least the portion of the selected predefined articulatory speech synthesis model comprises synthesizing speech using model parameters of the selected predefined articulatory speech synthesis model.

8. The method of claim 1, in which each one of the predefined models includes exteriorly visible articulatory speech synthesis model parameters defined by facial characteristics of a corresponding modeled voice and interiorly concealed articulatory speech synthesis model parameters defined by internal vocal tract characteristics of the corresponding modeled voice.

9. The method of claim 8, in which the associating of the at least the portion of the selected predefined articulatory speech synthesis model comprises synthesizing speech based on the exteriorly visible articulatory speech synthesis model parameters of the person's voice and based on the interiorly concealed articulatory speech synthesis model parameters of the selected predefined articulatory speech synthesis model.

10. The method of claim 8, in which the selection is based on a measure of correlation between the exteriorly visible articulatory speech synthesis model parameters of the person's voice and the exteriorly visible articulatory speech synthesis model parameters of the selected predefined articulatory speech synthesis model.

11. The method of claim 8, in which the associating of the at least the portion of the selected predefined articulatory speech synthesis model comprises communicating to a user equipment device the interiorly concealed articulatory speech synthesis model parameters of the selected predefined articulatory speech synthesis model for use in conjunction with exteriorly visible articulatory speech synthesis model parameters of the person's voice.

12. The method of claim 1, in which the acquiring of the image data comprises receiving an image file communicated over a network from a user equipment device.

13. The method of claim 12, in which the selecting comprises comparing of the one or both of the facial characteristics or the exteriorly visible articulatory speech synthesis model parameters to those of the predefined models.

14. The method of claim 1, in which the associating of the at least the portion of the selected predefined articulatory speech synthesis model comprises communicating to a user equipment device interiorly concealed articulatory speech synthesis model parameters of the selected predefined articulatory speech synthesis model.

15. The method of claim 14, further comprising combining the exteriorly visible articulatory speech synthesis model parameters of the person's voice with the interiorly concealed articulatory speech synthesis model parameters.

16. The method of claim 1, further comprising rejecting the submission in response to the synthesized speech output insufficiently matching the voice sample recording.

17. At least one non-transitory computer readable storage medium, having instructions stored thereon, that when executed on a device, configure the device to perform the method of claim 1.

\* \* \* \* \*